United States Patent [19]

DeGeorge

[11] Patent Number: 5,467,516
[45] Date of Patent: Nov. 21, 1995

[54] PALLET SLAT SALVAGING APPARATUS

[76] Inventor: Rick E. DeGeorge, 2423 Harrisburg Pike, Lancaster, Pa. 17601

[21] Appl. No.: 230,829

[22] Filed: Apr. 21, 1994

[51] Int. Cl.⁶ .................................................. B23P 19/00
[52] U.S. Cl. .............................................. 29/239; 29/252
[58] Field of Search ........................... 29/239, 252, 403.3, 29/426.5, 426.4

[56] References Cited

U.S. PATENT DOCUMENTS

| | | | |
|---|---|---|---|
| 4,089,098 | 5/1978 | DeMarco | 29/239 |
| 4,285,110 | 8/1981 | Fagre, Jr. | 29/252 |

Primary Examiner—Robert C. Watson
Attorney, Agent, or Firm—Martin Fruitman

[57] ABSTRACT

The apparatus is a machine for removing and salvaging end slats from a wooden pallet. At one end of a support table there are several power operated arms which move up and pry the end slat off the pallet. A power operated clamp assembly holds the pallet down tightly against the table, and the arms are constructed with large surface area pads so that neither the pallet nor the slat are subjected to any destructive forces. As the slat is removed from the pallet, the arms pivot down to an angle of approximately 60 degrees to the table so that the loose slat slides down to a location where it can easily be removed for reuse.

6 Claims, 1 Drawing Sheet

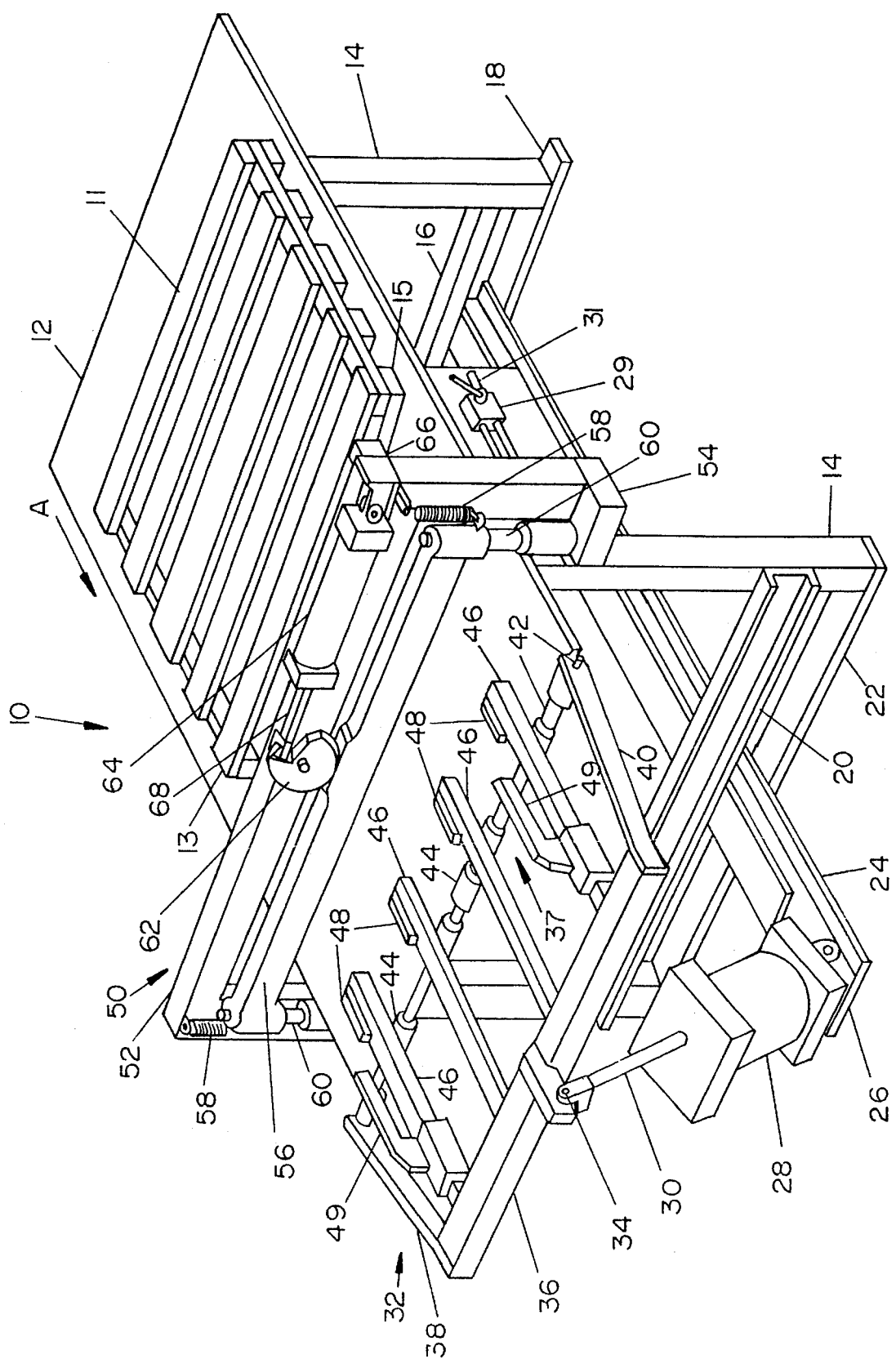

PALLET SLAT SALVAGING APPARATUS

BACKGROUND OF THE INVENTION

The invention deals generally with a disassembling apparatus and more specifically with an apparatus for removing salvageable end slats from wooden pallets.

Almost everyone is familiar with the common wooden pallet. It is a low height, open ended, box-like structure which is used to support loads above floor level so that they can be moved easily without any special effort to get the loads onto a wheeled vehicle. The typical pallet has two layers of separated flat, parallel slats, with the two layers of slats attached to and separated by three "stringers". The slats are usually nailed to the stringers, and the stringers run perpendicular to the slats and are located at the sides and in the center of the pallet. The stringers are typically four to six inches high so that the forks of a towmotor vehicle or a pallet truck can be placed between the layers of slats to lift a load placed on the top layer of slats.

It is not surprising to learn that pallets suffer considerable damage in their normal use. The forces applied to them by powerful towmotor vehicles and by overhanging loads can particularly damage the end slats whose edges are exposed to contact with the vehicle. The other components of a pallet, the stringers and the inner slats, are, however, much less likely to suffer damage. What is not so apparent about pallets is that they have a significant cost of manufacture, and that it is economically advantageous to repair those with damaged end slats, rather than to discard a whole pallet.

Furthermore, even though it can be beneficial to repair or replace the end slats using even simple hand tools, it is substantially cheaper to do so when a machine is available to remove the end slats quickly. At least one such machine has been patented. U.S. Pat No. 4,285,110 by Fagre describes such a device. It operates upon a pallet resting on a flat table surface by locating an end slat within a slot formed of multiple fingers, and then pivoting the slot 90 degrees until it is directly above the pallet so that the slat is pulled from the stringers and falls down on the pallet.

It is particularly noteworthy that, when the action to move the slat begins, the pallet also is moved until it slams into a fixed pallet stop to prevent further motion. This impact of the pallet hitting the stop can cause severe damage to both the slat being removed and the other components of the pallet. The slat being removed is frequently broken or otherwise damaged by the force of the narrow fingers lifting the slat when the pallet is suddenly impacted against the pallet stop. Nevertheless, this pallet movement and the violent impact with the stop has been considered an effect of such machines which can not be escaped. Since pallets are not precision made assemblies, and there is no requirement to make them as such, it is not unusual to have rather large variations in the heights of the pallets which are encountered by a disassembly machine. Thus, if a machine is built to minimize the movement of the pallet by locating the fixed pallet stop so that it has a close clearance with one pallet, there is a good chance that the pallet stop will prevent another somewhat higher pallet from being loaded into the machine. On the other hand, if the pallet stop is located to permit clearance with the highest possible pallet, the pallets with less height will be slammed against the pallet stop when the machine operates to separate a slat from the stringers.

The pallet disassembly machine of the present invention solves this dilemma and furnishes a machine which removes the end slats without substantial additional damage to the slats. The present invention thereby makes many of the slats which are removed from the pallets available for reuse.

SUMMARY OF THE INVENTION

The present invention is a pallet disassembly machine which removes end slats more quickly than previous machines and removes the slats without subjecting them or the other components of the pallet to any damage.

The preferred embodiment of the invention is constructed as a table with a flat, steel, top surface with a pivoting arm assembly located at one end of the table. The several arms on the arm assembly are located so that their rest positions are slightly above the table surface. Thus, when a pallet is placed flat on the table and slid to the end of the table with the pivoting arm assembly, the ends of the arms extend into the end of the pallet so that they are under the end slat of the upper layer of slats, but over the end slat of the lower layer of slats.

The pivoting arm assembly is operated by a pneumatic piston and has a configuration which places the pivot point at the edge of the table so that the axle around which the arm assembly pivots also acts as a locator stop for correctly positioning the pallet. A lower segment of the arm assembly is constructed as a frame with the portion of the frame most remote from the table having a rest position which results in the frame being angled slightly upward from the table and extending from the table as if it were an extension of the table. The arms are then attached to the portion of the frame which is most remote from the table, but the arms extend back toward the table and are oriented in a plane approximately parallel to the table but slightly above the top surface of the table.

Since the arms cross over the pivot point, as the far end of the frame is pulled down by the pneumatic piston, the working ends of the arms over the table pivot upward and push against the pallet end slat located above them. It is this action which separates the slat from the stringers to which it is attached. The working ends of the arms have steel pads of significant surface area attached to their top surfaces, so that the large surface area of the pads is the actual surface that contacts the slat being removed. This expanded surface area spreads the lifting force over a significant portion of the slat surface and reduces the likelihood of any damage to the slat.

However, to accomplish the separation, the pallet must be prevented from moving along with the slat being removed. Unlike the prior art devices, in the present invention this is not accomplished by a fixed stop, but instead by a power operated, automatically adjusted, hold down clamp. With such a device each pallet is held firmly against the table regardless of its variation from a standard height, and there is neither pallet movement nor damaging impact with the stop. The clamping system also permits a shorter throw for the slat lifting arms, and therefore permits the time for the entire disassembly operation to be reduced.

The pallet clamp is constructed as an assembly which spans the entire width of the support table. This assembly includes a fixed bridge support, which is attached to the supports for the pallet table, and a moveable clamp bar which rides upon vertical guide pins located beyond the table edges so that they are clear of any pallet located on the table. Springs attached to the clamp bar and anchored on the fixed bridge support pull the clamp bar up toward the fixed bridge support.

A clamp activating means is also included in the assembly. In the preferred embodiment this activating means is a cam operated by a pneumatic piston. The cam is rotated by the piston and forces the clamp bar down upon the top surface of the pallet, thereby clamping the pallet tightly against the table. The actual movement of the clamp need not be very great. It is only necessary for the clamp to move over a range which is slightly greater than the range of variation in the height of the pallets being disassembled. Thus a total movement of three to four inches permits the highest possible pallet to slip under the clamp and still permits the lowest possible pallet to be held tightly against the support table while the end slats are lifted off and away from the stringers.

Another valuable feature Of the present invention is the slat catching system. As the padded ends of the arms are raised, and they lift the slat off of the stringers, the opposite ends of the arms are lowered below the plane of the table. The angle at which the arms are positioned at the end of the lifting action, when the slat is loose, is between 50 and 60 degrees to the horizontal plane of the table. This angle is sufficient to cause the loose slat to slip down to the far end of the arms, where it is caught by at least two keepers generally shaped like hooks.

Therefore, in a time span of about three seconds, a pallet which has previously been loaded into the present invention is clamped securely on the table, has the upper layer end slat removed without damage to either the slat or the pallet, and delivers the separated slat to a convenient location for removal from the machine. The invention thereby furnishes a machine which removes slats, most of which can be reused, and does so quickly and safely.

BRIEF DESCRIPTION OF THE DRAWING

The FIGURE is a perspective view of the preferred embodiment of the pallet disassembling machine of the invention.

DETAILED DESCRIPTION OF THE INVENTION

The FIGURE is a perspective view of pallet disassembling machine 10 which includes table surface 12 supported by legs 14 and cross braces 16, 18, 20 and 22. "I" beam 24 is located below the center of table surface 12, and one end 26 of beam 24 extends out from under table surface 12. Pallet 11 with end slat 13 is placed upon table surface 12 for disassembly and moved in direction A in order for pallet 11 to be engaged by pallet disassembling machine 10.

One end of pneumatic cylinder 28 is anchored to end 26 of beam 24, while rod 30 which is attached to the internal piston of pneumatic cylinder 28 is connected to arm assembly 32 at pivoting connector 34. Pneumatic cylinder 28 is interconnected with and controlled by valve 29 to which pressurized air is fed by tubing 31.

Arm assembly 32 is constructed with beam 36, which is parallel to and remote from working edge 37 of table surface 12, and two sides 38 and 40 are attached to beam 36 and to pivot axis 42. Pivot axis 42 is a rod pivotably attached to working edge 37 of table surface 12 and includes sleeves 44, against which pallet 11 is placed by moving pallet 11 in direction A until it engages sleeves 44.

Arms 46 are attached to beam 36 and extend back toward table surface 12 in a plane approximately parallel to but above table 12. Arms 46 are thus located above pivot axis 42. Arms 46 extend far enough over working edge 37 and pivot axis 42 so that the ends of arms 46 extend over table surface 12 at least a distance equivalent to the largest expected width for a pallet end slat 13.

Sides 38 and 40 pivot upon pivot axis 42, and when pneumatic cylinder rod 30 is fully extended, rest in a position which results in sides 38 and 40 being angled slightly upward from working edge 37 and extending from table surface 12 as if they determined an extension of the table. When sides 38 and 40 are located in that position and pallet 11 is pushed against sleeves 44, arms 46 are located between the bottom end slat 15 and top end slat 13 of pallet 11.

Since arms 46 cross over pivot axis 42, as beam 36 is pulled down when pneumatic piston 28 is operated, the ends of arms 46 that are over the table pivot upward and push against pallet end slat 13 located above them. It is this action which separates the slat from the stringers to which it is attached. The ends of arms 46 have steel pads 48 attached to their top surfaces, so that the top surface area of the pads is the actual surface that contacts the slat being removed. The surface areas of pads 48 spread the lifting force over a significant portion of the slat surface and reduce the likelihood of any damage to the slat.

As the slat is detached from the pallet, the position of arms 46, with pads 48 high and beam 36 low, places arms 46 at an angle of 50 to 60 degrees to the horizontal, with the loose slat at the high ends of arms 46. This causes the freed slat to slide down toward beam 36 where it is captured by hooks 49. Since this location for the removed slat is well clear of the pallet and the working portion of the machine, it is a simple and safe task for the operator to remove the loose slat from the machine. Moreover, the movement of the slat is sufficiently controlled so that the slat is also not damaged by the motion.

In order for slat 13 to be separated from pallet 11 there must, of course, be a reaction force acting upon pallet 11. This force is applied by clamp assembly 50. Clamp assembly 50 is supported by bridge 52 which is attached to table support legs 14 by support structure 54 which straddles table surface 12. Clamp bar 56 is attached to and pulled up toward bridge 52 by springs 58 which are anchored on bridge 52. Clamp bar 56 also slides on guide pins 60 so that its path of motion is restricted to a vertical plane.

Clamp bar 56 is moved downward toward table surface 12 and the top surface of pallet 11 by the action of cam 62. Cam 62 is powered by pneumatic cylinder 64 which is controlled by valve 66. As rod 68 is retracted into pneumatic cylinder 64, cam 62 turns so that increasingly larger radii contact clamp bar 56 and thus force clamp bar 56 down onto pallet 11, clamping the pallet tightly against table surface 12.

It is this clamping action which accommodates the present invention to variations in heights of pallets and prevents any movement of the pallets along with subsequent impact on a fixed stop.

The present invention thereby prevents damage to both the slat being removed and the other portions of the pallet, and therefore provides a very high yield of reusable slats. Also, because of the short paths of movement of both arm assembly 32 and clamp assembly 50, the cycle of operation of the invention is quite short, therefore furnishing increased speed of operation and the benefit of higher production from a single machine.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, hydraulic cylinders or electric motors could be used to power the machine components.

What is claimed as new and for which Letters patent of the United States are desired to be secured is:

1. An apparatus for removing a slat from a pallet comprising:

a table surface located upon a support structure with the table surface determining a plane;

an arm assembly pivotably attached to the table surface at a pivot axis and extending away from the pivot axis to an end structure, the arm assembly including a plurality of arms which have free ends, with the arms attached to the end structure and oriented so that the arms extend from the End structure and across the pivot axis, with the free ends of the arms located adjacent to a portion of the table surface, so that the free ends of the arms move in a direction opposite from the movement of the end structure;

a motive means connected to the arm assembly to move the arms over a path so that the free ends of the arms move away from and then back toward the table surface; and clamp means to hold a pallet on the table surface and prevent any movement of the pallet as the arms engage a slat on the pallet and move away from the table surface;

wherein the clamp means comprises:

a support means located so that it is spaced away from the table surface;

a clamp structure movably attached to the support means and spaced away from the table surface in a first position;

a motive means operating upon the clamp structure to move the clamp structure from the first position and into a second position which is closer to the table surface than the first position, and in which the clamp structure engages a pallet located on the table surface; and a return means acting on the clamp structure to return it to the first position when the force of the motive means is released from the clamp structure;

wherein the motive means is a cam rotated by a pneumatic cylinder, and the return means is at least one spring attached to the clamp structure and anchored on the support means.

2. The apparatus of claim 1 further including engagement means to position a pallet placed within the apparatus so that the free ends of the arms are located adjacent to a pallet slat and closer to the table surface than the slat.

3. The apparatus of claim 2 wherein the engagement means is attached to the pivot axis.

4. The apparatus of claim 1 further including pads attached to the free ends of the arms and located so that the pads are the part of the arms which contact a slat on a pallet.

5. An apparatus for removing a slat from a pallet comprising:

a table surface located upon a support structure with the table surface determining a plane;

an arm assembly pivotably attached to the table surface at a pivot axis and extending away from the pivot axis to an end structure, the arm assembly including a plurality of arms which have free ends, with the arms attached to the end structure and oriented so that the arms extend from the end structure and across the pivot axis, with the free ends of the arms located adjacent to a portion of the table surface, so that the free ends of the arms move in a direction opposite from the movement of the end structure;

a motive means connected to the arm assembly to move the arms over a path so that the free ends of the arms move away from and then back toward the table surface; and clamp means to hold a pallet on the table surface and prevent any movement of the pallet as the arms engage a slat on the pallet and move away from the table surface;

wherein the arms pivot to an orientation of between 50 and 60 degrees to the horizontal as a slat is removed from a pallet, and wherein the arms support the removed slat as it slides down the arms and away from the table surface.

6. An apparatus for removing a slat from a pallet comprising:

a table surface located upon a support structure with the table surface determining a plane;

a power operated arm assembly pivotably attached to the table surface, with the arm assembly positioned to engage and remove a slat from a pallet located upon the table surface; and clamp means to hold a pallet on the table surface and prevent any movement of the pallet as the arm assembly engages and removes a slat from the pallet;

wherein the clamp means comprises:

a support means located so that it is spaced away from the table surface;

a clamp structure movably attached to the support means and spaced away from the table surface in a first position;

a motive means operating upon the clamp structure to move the clamp structure from the first position and into a second position which is closer to the table surface and in which the clamp structure engages a pallet located on the table surface; and a return means acting on the clamp structure to return it to the first position when the force of the motive means is released from the clamp structure;

wherein the motive means is a cam rotated by a pneumatic cylinder, and the return means is at least one spring attached to the clamp structure and anchored on the support means.

* * * * *